United States Patent [19]

Johnsen et al.

[11] Patent Number: 4,708,282

[45] Date of Patent: Nov. 24, 1987

[54] WELDING ALLOY AND METHOD OF MAKING AND USING THE SAME

[75] Inventors: John L. Johnsen, Portland; William E. Wood, Hillsboro; Jack H. Devletian, Portland, all of Oreg.; Donald G. Spring, San Pedro, Calif.

[73] Assignee: Huck Manufacturing Company, Southfield, Mich.

[21] Appl. No.: 787,299

[22] Filed: Oct. 15, 1985

[51] Int. Cl.$^4$ ............................................. B23K 35/32
[52] U.S. Cl. ............................... 228/263.16; 420/424; 219/118; 228/263.21
[58] Field of Search ....................... 228/263.21, 263.16, 228/263.19; 420/424; 219/118

[56] References Cited

U.S. PATENT DOCUMENTS

| | | | |
|---|---|---|---|
| 3,038,988 | 6/1962 | Kessler et al. | 219/118 X |
| 3,425,116 | 2/1969 | Crooks | 420/424 |
| 4,148,669 | 4/1979 | Tanner et al. | 148/13.2 X |
| 4,514,470 | 4/1985 | Rosenthal et al. | 228/263.21 |
| 4,559,200 | 12/1985 | Yamasaki | 420/489 X |

FOREIGN PATENT DOCUMENTS 1946237 3/1971 Fed. Rep. of Germany ...... 420/424

Primary Examiner—Kenneth J. Ramsey
Attorney, Agent, or Firm—Robert F. Hess; Lawrence J. Shurupoff

[57] ABSTRACT

The invention is a weld metal for welding of a titanium alloy member to a ferrous based alloy member as an intermediate transition zone between such members so as to overcome the metallurgical imcompatability of each such member, and which consists of a vanadium metal, titanium and iron and inconsequential amounts of brittle intermetallic compounds. The preferred weld metal is vanadium rich and contains no more than 50% combined weight of titanium and such a weld metal is produced in accordance with our invention by fusion welding, particularly capacitor discharge welding, which because of its inherent but heretofore unrecognized extremely fast quench or freeze rates will produce a fusion weld between these two metallurgically incompatible alloys which is free of brittle intermetallic compounds. It is also part of our invention that such a weld metal of the aforesaid composition will have independent use as a welding alloy, particularly when fabricated in sheet form.

11 Claims, 10 Drawing Figures

POSSIBLE ISOTHERMAL SECTION (T=room temperature) OF V-Ti-Fe NON-EQUILIBRIUM PHRASE DIAGRAM.

EQUILIBRIUM PHASE DIAGRAM FOR Ti-Fe BINARY SYSTEM.

VERTICAL SECTION OF V-Ti-Fe TERNARY EQUILIBRIUM PHASE DIAGRAM THROUGH TiFe AND V.

PARTIAL VERTICAL SECTION OF V-Ti-Fe TERNARY EQUILIBRIUM PHASE DIAGRAM THROUGH Ti-16Fe AND V.

PARTIAL ISOTHERMAL SECTION (T=R.T.) OF V-Ti-Fe
TERNARY EQUILIBRIUM PHASE DIAGRAM.

POSSIBLE ISOTHERMAL SECTION (T=R.T.) OF V-Ti-Fe EQUILIBRIUM PHASE DIAGRAM

POSSIBLE ISOTHERMAL SECTION (T=room temperature) OF V-Ti-Fe NON-EQUILIBRIUM PHRASE DIAGRAM.

LIGHT MICROGRAPH OF SOLIDIFICATION STRUCTURE OF
SPECIMEN P-1 (100.0V), 256X

LIGHT MICROGRAPH OF SOLIDIFICATION STRUCTURE OF
SPECIMEN P-2 (90.5V-9.5Ti), 256X

LIGHT MICROGRAPH OF SOLIDIFICATION STRUCTURE OF
SPECIMEN P-26 (47.7V-52.3Fe), 256X.

DUCTILITY OF SPECIMENS P-1 THROUGH P-26.

WELDING ALLOY AND METHOD OF MAKING AND USING THE SAME

Developed Under Contract with The Oregon Graduate Center, Portland, Oreg.

BACKGROUND OF THE INVENTION

This invention relates to welding titanium alloys to ferrous metal alloys and more particularly to the development of an intermediate weld metal composition compatible to both titanium and a ferrous metal such that the inherently brittle intermetallic phases of TiFe and $TiFe_2$ normally formed during a fusing or melting of titanium to a ferrous metal will not be formed, or if formed will be present in such minimal amounts as to not preclude the usefulness of the weld. Additionally the invention relates to joining titanium to a ferrous metal by fusion welding techniques and developing the aforementioned intermediate alloy during the fusion welding process itself.

Titanium alloys have proved impossible to weld properly to ferrous or ferrous based materials, that is, to obtain a weldment of sufficient strength/ductility to be useful. Fusion of these two metals at an interface results in formation of brittle iron-titanium intermetallic compounds, namely or chiefly TiFe and $TiFe_2$. Nevertheless, it is presently possible to obtain useful welds of titanium alloys to iron alloys by the use of non-fusion welding processes such as friction welding, pressure welding, and explosive bonding. One example of this is shown and described in U.S. Pat. No. 3,038,988 to Kessler et al wherein a titanium liner is welded to a steel sheet support structure in a chemical tank by means of inserting therebetween a vanadium or molybdenum sheet and then resistance welding together all three sheets but without causing fusion of the intermediate vanadium or molybdenum sheet.

SUMMARY OF THE INVENTION

The invention is a weld metal for welding of a titanium alloy member to a ferrous based alloy member as an intermediate transition zone between such members so as to overcome the metallurgical incompatability of each such member, and which consists of a vanadium metal, titanium and iron and no brittle intermetallic compounds. The preferred weld metal is vanadium rich and contains no more than 50% combined weight of titanium and iron. Such a weld metal is produced in accordance with our invention by fusion welding, particularly capacitor discharge welding, which because of its inherent but heretofore unrecognized extremely fast quench or freeze rates will produce a fusion weld between these two metallurgically incompatible alloys which is free of brittle intermetallic compounds. It is also part of our invention that such a weld metal of the aforesaid composition will have independent use as a welding alloy, produced in a manner as taught herein, particularly when fabricated in sheet form.

It is therefore an object of this invention to provide a weld metal composition particularly suitable for fusion welding titanium to iron such that the formation of brittle intermetallic compounds can be eliminated or controlled.

It is a further object of this invention to provide such a weld metal composition which can, by closely controlled fusion weld techniques, be produced during the fusion welding process itself, and particularly in the fusion zone of a capacitor discharge weld.

It is a still further object of this invention to provide a weld metal composition consisting of (i) a base metal having solid solubility in titanium and iron and (ii) titanium and iron, or alloys thereof, in an amount ranging by weight up to about 50%.

It is another object to provide such a weld metal composition as mentioned above which is also useful in joining titanium to steel by several welding techniques including fusion and nonfusion welding. Such a weld metal composition will comprise anywhere from 0% to about 75% titanium, 0% to 40% iron and the balance a metal such as vanadium, molybdenum, or other metal or metals having solid solubility with titanium and/or iron. All percentages stated throughout this application are in terms of percent by weight. Further where titanium and iron are generally referred to it is meant, unless otherwise indicated, pure titanium and the alloys thereof and pure iron and the alloys thereof.

DETAILED DESCRIPTION OF THE PREFERRED EMBODIMENT

In developing such an alloy as constitutes our invention, it was of course known that titanium and iron were metallurgically incompatible and would form brittle intermetallic compounds of TiFe and $TiFe_2$ but that useful welds of the two could be produced with the addition of an intermediate alloy such as vanadium or molybdenum which has solid solubility with both titanium and iron. Nevertheless, where this intermediate alloy was reduced completely to a liquid phase, as during fusion, the aforementioned undesirable intermetallic compounds were again formed.

Figure 1:
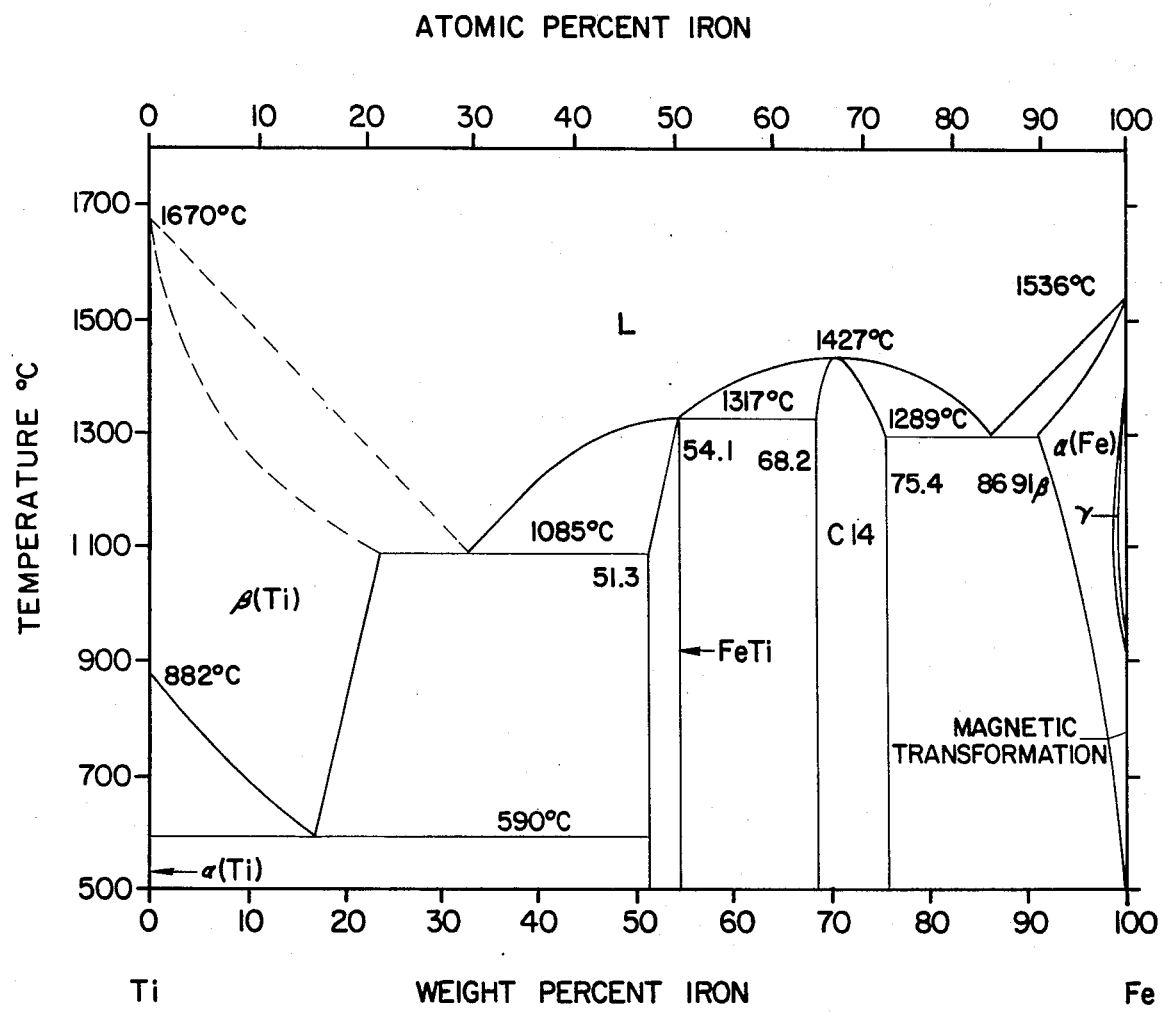
FIG. 1 is an equilibrium phase diagram for a Ti-Fe binary system.

That these intermetallic compounds TiFe and $TiFe_2$ would be formed when titanium and iron were the sole welding constituents is quite predictable based on the binary system phase diagram for these two elements as shown in FIG. 1, wherein there is shown to exist six distinct equilibrium phases. These are the liquid phase, the alpha(Ti) phase, the beta(Ti) phase, the TiFe intermetallic or delta phase, the TiFe$_2$ intermetallic or C14 phase, and the gamma(Fe) phase. The alpha(Fe) phase shown in the Ti-Fe equilibrium phase diagram of FIG. 1 has the same crystal structure as the beta(Ti) phase and is not, therefore, considered a separate or distinct phase in the system.

The alpha(Ti) phase is the terminal solid solution phase of iron in titanium at temperatures below 882° C. It has a hexagonal close-packed (HCP) crystal structure and exists as a single phase over a very limited range of compositions below 882° C. The maximum solid solubility of iron in alpha-titanium is less than 0.06 weight percent at 590° C.

The beta(Ti) phase is the terminal solid solution phase of iron in titanium at temperatures about 882° C. The beta(Ti) phase has a body-centered cubic (BCC) crystal structure and exists as a single phase over a considerable range of compositions and temperatures. The maximum solid solubility of iron in beta-titanium is about 24 weight percent at 1,085° C.

The beta(Ti) phase is also the terminal solid solution phase of titanium in iron at temperatures below 911° C. and above 1,392° C. Near the iron end of the TiFe equilibrum phase diagram, beta(Ti) or alpha(Fe) exists as a single phase over a considerable range of compositions and temperatures. The maximum solid solubility of titanium in alpha-iron is about 9 weight percent at 1,289° C.

The TiFe intermetallic or delta phase is an ordered phase whose crystal structure has the cesium chloride structure (CsCl) as its stereotype. As a single phase, it exists from about 51.4 to 54.4 weight percent iron and up to a temperature of 1,317° C. It is noteworthy that as a two-phase component at room temperature it occurs over a range of compositions that extends from nearly pure titanium to approximately 68 weight percent iron.

The TiFe$_2$ intermetallic or C14 phase is also an ordered phase, but one whose crystal structure has the hexagonal magnesium zinc (MgZn$_2$) structure as its stereotype. As a single phase, the C14 phase extends from about 69.2 to 75.5 weight percent iron and up to a temperature of 1,427° C. It is noteworthy here also that, as a two-phase component at room temperature the C14 phase occurs over the entire range of compositions from 54.4 to 99.5 weight percent iron.

The gamma(Fe) phase is the terminal solid solution phase of titanium in iron between the temperatures of 911° C. and 1,392° C. It has a face-centered cubic (FCC) crystal structure and exists as a single phase over a limited range of compositions at the iron end of the equilibrium phase diagram. The maximum solid solubility of titanium in gamma-iron is 0.7 weight percent at 1,150° C.

With regard to the intermetallic compounds TiFe and TiFe$_2$, it is especially significant that one or both of these phases occurs over nearly the entire range of compositions from pure titanium to pure iron. This, when considered in conjunction with the knowledge that these ordered phases can cause embrittlement even when present in small amounts, shows clearly the extent of the metallurgical incompatibility of titanium and iron.

Further, while it was known prior to our invention that vanadium was compatible with titanium and iron separately, the prior art teaches, as for example in aforementioned U.S. Pat. No. 3,038,988 to Kessler et al, that fusion of all three of these metal is to be avoided since certain unstated brittle intermetallic compounds known to be TiFe and TiFe$_2$ will be formed which will ruin the weld. We questioned whether this phenomena had to be true under all circumstances and welding parameters. While a characterization of the V-Ti-Fe ternary system was an essential part of our invention, in that it would be useful in providing insights as to the probable effectiveness of vanadium as an elemental alloy addition to the TiFe binary system and as a reference against which the experimental behavior of V-Ti-Fe ternary system alloys could be judged, there is very little information available on the V-Ti-Fe ternary system. Furthermore, the information that is available is somewhat out of date and generally limited to the titanium-rich portion of the system. The main and perhaps most useful information is a number of vertical and partial isothermal sections of the V-Ti-Fe ternary equilibrium phase diagram.

Figure 2:
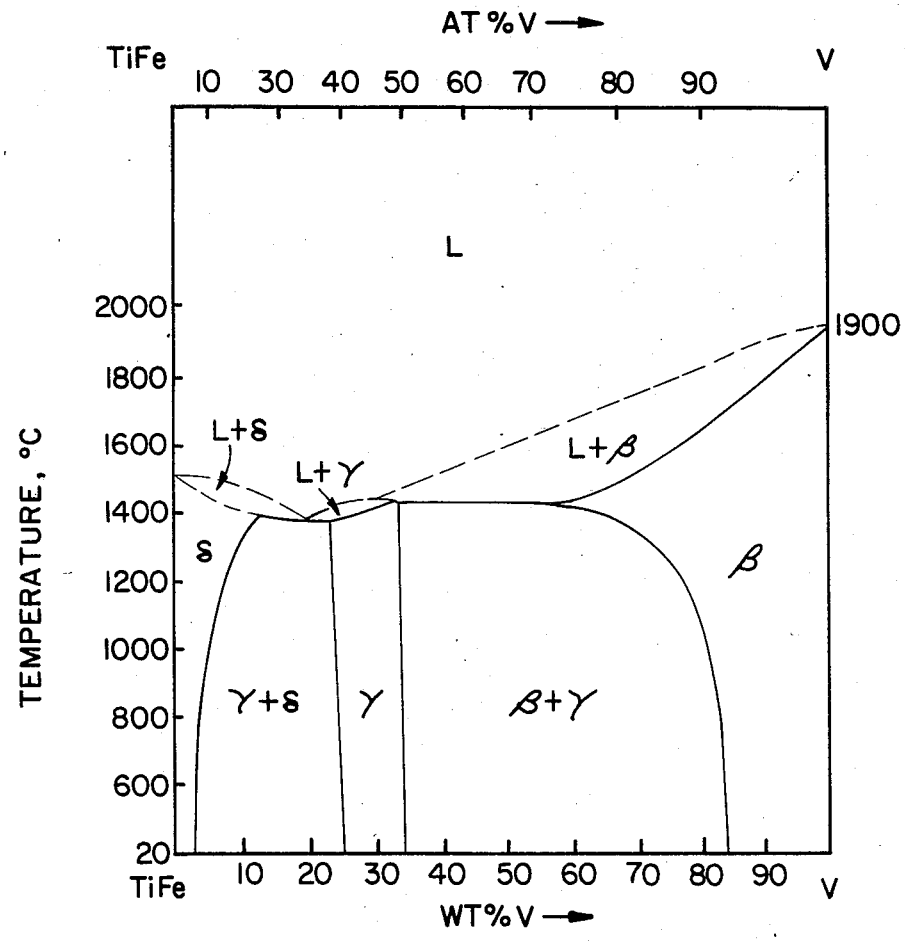
FIG. 2 is a vertical section of a V-Ti-Fe ternary equilibrium phase diagram through Ti-Fe and V.

For example the vertical section through V-Ti-Fe shown in FIG. 2 has a number of interesting and revealing features. Probably the most significant among them, however, is the apparent existence of an ordered V-Ti-Fe ternary intermetallic compound, referred to in the diagram as the gamma phase which, in a sense, constitutes a realization of one's worst fears. Namely, that the addition of elemental vanadium to the Ti-Fe binary system might cause the formation of entirely new intermetallic compounds or ordered phases in the resulting V-Ti-Fe system. Neither is it encouraging that the gamma phase appears to melt congruently, thus obviating any possibility of avoiding its formation by the retention of some less undesirable phase.

On the other hand, the vertical section shown in FIG. 2 indicates also that, for high vanadium concentrations, the first phase to solidify is the beta(Ti) or beta phase. This is encouraging, since, in substantial portions of the Ti-Fe binary system and throughout the Fe-V binary system, the beta phase tends to be retained during quenching, in preference to the formation of other, less desirable phases.

Figure 3:
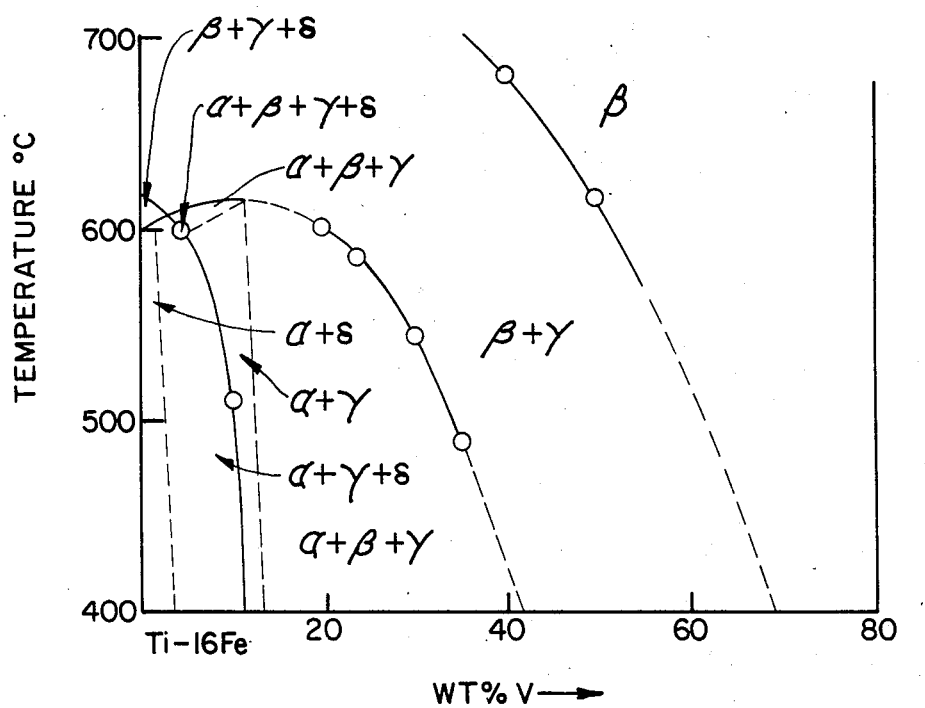
FIG. 3 is a partial vertical section of a V-Ti-Fe ternary equilibrium phase diagram through Ti-16Fe and V.

The partial vertical section through Ti-16Fe-V shown in FIG. 3 deals with the limited range of temperatures from 400° C. to 700° C. It is instructive, to the extent that it infers the equilibrium phases that exist at room temperature and reveals the incredible complexity that most characterizes the V-Ti-Fe ternary system.

Figure 4:
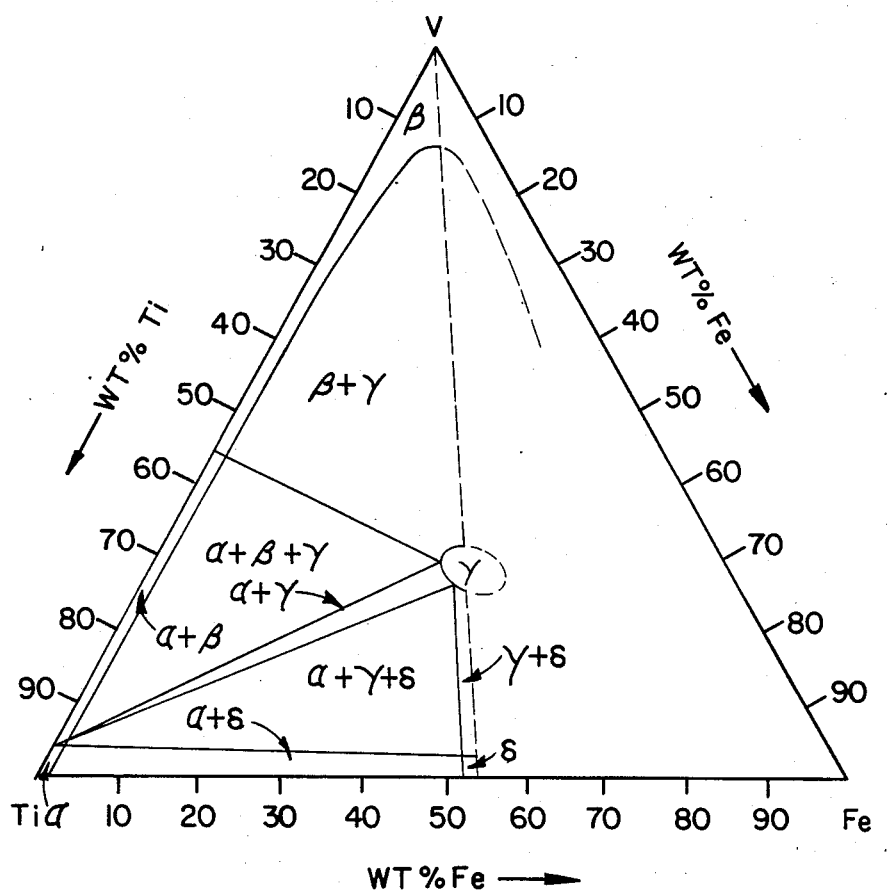
FIG. 4 is a partial isothermal section (T=room temperature) of a V-Ti-Fe ternary equilibrium phase diagram.

The partial room temperature isothermal section of the V-Ti-Fe ternary equilibrium phase diagram shown in FIG. 4 makes a substantial contribution to an understanding of at least part of the V-Ti-Fe system. It includes the aforementioned gamma(VTiFe) phase and depicts its stability with respect to the equilibrium phases of the Ti-Fe and Ti-V binary systems.

Figure 5:
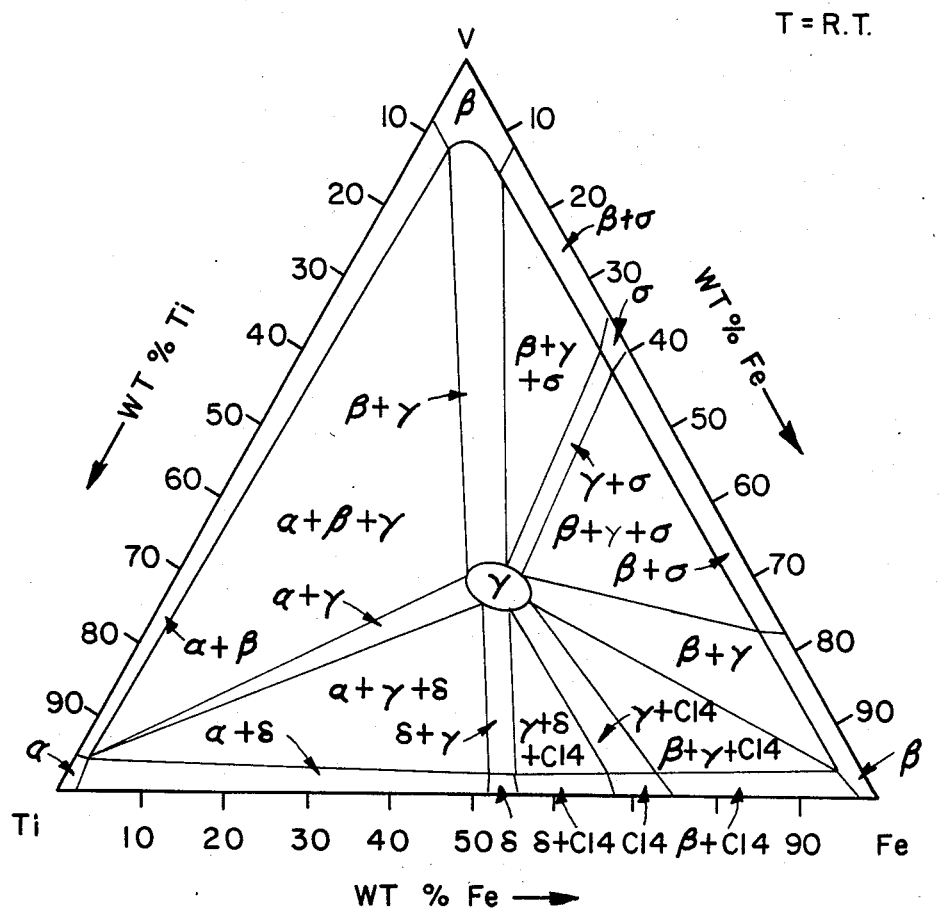
FIG. 5 is a possible isothermal section (T=room temperature) of a V-Ti-Fe equilibrium phase diagram.
Figure 6:
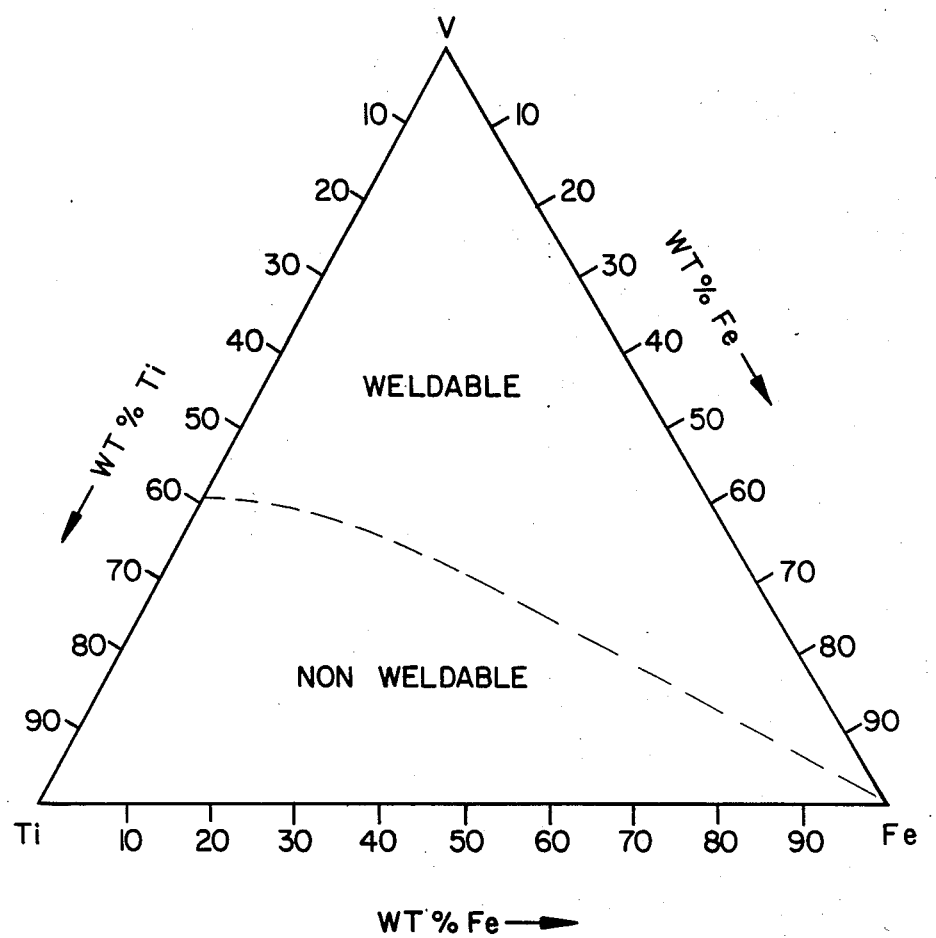
FIG. 6 is a possible isothermal section (T=room temperature) of a V-Ti-Fe non-equilibrium phase diagram.

From these Ti-Fe, Ti-V, and Fe-V binary equilibrium phase diagrams shown in FIGS. 1-4 were deduced the isothermal sections of the V-Ti-Fe ternary equilibrium phase diagram shown in FIG. 5 and the non-equilibrium phase diagram shown in FIG. 6. While these are strictly qualitative in nature and reflect thermodynamic and/or experimental considerations only, even so, they represent a feasible ternary system and provide a basis for the interpretation of our experimental results described below.

The isothermal section shown in FIG. 5 contains seven distinct equilibrium phases. These are the liquid phase, the alpha(Ti) or alpha phase, the beta(Ti) or beta phase, the V-Ti-Fe intermetallic or gamma phase, the TiFe intermetallic or delta phase, the TiFe$_2$ intermetallic or C14 phase, and the FeV intermetallic or sigma phase. Further discussion of all of these phases is not deemed necessary except to point out that while all indications are that the V-Ti-Fe ternary system is a very complex system that involves a large number of both variant and invariant equilibrium reactions, nevertheless, it appeared that under conditions of rapid quenching or freezing one could hope to produce a weld metal of the highly ductile beta phase composition. FIG. 6 is a modified representation of FIG. 5 and shows the beta and beta plus gamma phases of the ternary system. Our experiments, described below, verified the general accuracy of FIG. 6 and showed that if the V, Ti and Fe are mixed in the liquid state, the weld joint will tend to become embrittled with decreasing V content. The Ti-V-Fe alloys containing greater than 50% vanadium are found to be reasonably weldable because:

(1) the embrittling sigma (FeV) phase does not occur in non-equilibrium cooling and
(2) the embrittling delta (FeVTi) is sluggish to form during non-equilibrium cooling so a greater portion of ductile beta results.

Generally, the greater the percentage V above 50%, the greater will be the weld metal ductility. While FIG. 6 indicates a weld metal composition of greater than 32% vanadium is desirable, it is also likely given the results of FIG. 6 that a composition less than 32% V would produce a weld of satisfactory strength and ductility provided (i) the Fe content was no less than 75% that of titanium and (ii) one uses extra-low interstitual vanadium. This is considered quite problematical. Thus a vanadium content of at least 50% is preferred.

From these studies and considering also certain fusion weld interfacial phenomena it was determined that a useful alloy in welding titanium to steel, and one which could even very possibly be produced during fusion welding given a fast freezing or quenching control such as made possible for example by capacitor discharge welding, would be one falling within the ranges shown in Table 1 below:

TABLE 1

NOMINAL COMPOSITIONS OF SPECIMENS P-1 THROUGH P-26

| Specimen Designation | Nominal Composition (Atomic Percent) | Weight Percent |
| --- | --- | --- |
| P-1 | V | 100.0V |
| P-2 | V10Ti | 90.5V—9.5Ti |
| P-3 | V7.5Ti—2.5Fe | 90.2V—7.1Ti—2.7Fe |
| P-4 | V5Ti—5Fe | 89.8V—4.7Ti—5.5Fe |
| P-5 | V—2.5Ti—7.5Fe | 89.5V—2.3Ti—8.2Fe |
| P-6 | V—10Fe | 89.1V—10.9Fe |
| P-7 | V—20Ti | 81.0V—19.0Ti |
| P-8 | V—15Ti—5Fe | 80.3V—14.2Ti—5.5Fe |
| P-9 | V—10Ti—10Fe | 79.7V—9.4Ti—10.9Fe |
| P-10 | V—5Ti—15Fe | 79.1V—4.6Ti—16.3Fe |
| P-11 | V—20Fe | 78.5V—21.5Fe |
| P-12 | V—30Ti | 71.3V—28.7Ti |
| P-13 | V—22.5Ti—7.5Fe | 70.4V—21.3Ti—8.3Fe |
| P-14 | V—15Ti—15Fe | 69.6V—14.0Ti—16.4Fe |
| P-15 | V—7.5Ti—22.5Fe | 68.8V—6.9Ti—24.3Fe |
| P-16 | V—30Fe | 68.0V—32.0Fe |
| P-17 | V—40Ti | 61.5V—38.5Ti |
| P-18 | V—30Ti—10Fe | 60.5V—28.4Ti—11.1Fe |
| P-19 | V—20Ti—20Fe | 59.5V—18.7Ti—21.8Fe |
| P-20 | V—10Ti—30Fe | 58.6V—9.2Ti—32.2Fe |
| P-21 | V—40Fe | 57.8V—42.2Fe |
| P-22 | V—50Ti | 51.5V—48.5Ti |
| P-23 | V—37.5Ti—12.5Fe | 50.5V—35.6Ti—13.9Fe |
| P-24 | V—25Ti—25Fe | 49.5V—23.3Ti—27.2Fe |
| P-25 | V—12.5Ti—37.5Fe | 48.6V—11.4Ti—40.0Fe |
| P-26 | V—50Fe | 47.7V—52.3Fe |

Of the several methods of testing and analysis, those found most revealing were x-ray diffractometry analysis and microstructure analysis.

X-ray diffractometry analysis was performed using a Philips Model APD 3600 computer-controlled diffractometer on a representative number of Specimens P-1 through P-26 to identify the phases present in the as-cast V-Ti-Fe alloys. Of particular interest was the possible formation of the FeV binary and V-Ti-Fe ternary intermetallic phases described earlier. The presence of either of these phases, especially in large amounts, detracts materially from the usefulness of the subject alloys or weldment.

Specimens selected included (i) nominally pure vanadium (ii) certain specimens in the V-Fe binary system, (iii) certain specimens in the V-Ti-Fe ternary system having a titanium to iron ratio of unity and (iv) certain specimens in the V-Ti binary system.

In pure vanadium, used throughout our investigations as a reference source and forming no part of the subject invention, there was predicably no evidence of any phases other than the body-centered cubic phase of pure vanadium. Other phases that might be present in small amounts (e.g., less than one percent) would probably not be discernible from the trace.

The trace results for the remaining specimens verified the presence of the high temperature, body-centered cubic alpha(V) and beta(Ti) phases of an alloy of that composition. It addition there was virtually no evidence the occurrence of the brittle FeV intermetallic or sigma phase, nor the hexagonal close-packed alpha(Ti) phase, with the exception that the Specimen P-24 (49.5V-23.3Ti-27.2Fe) did show evidence of hexagonal V-Ti-Fe intermetallic or gamma phase. This is not considered detrimental to our invention since, as discussed earlier, the particular phase is slow to form and can be easily avoided by increasing the cooling rate, i.e. being more selective with the welding parameters.

Figure 7:
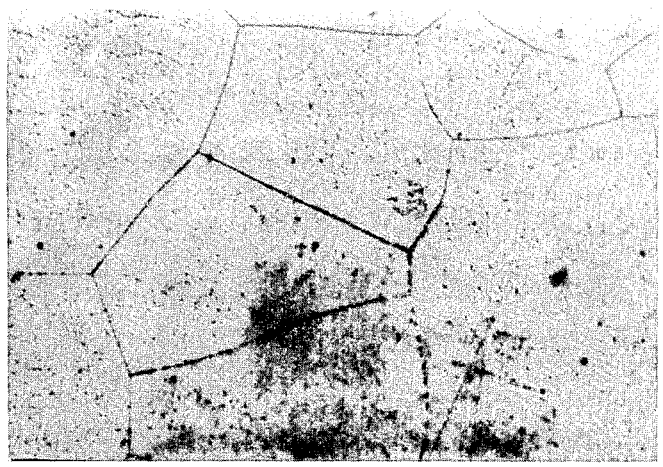
FIG. 7 is a light micrograph of solidification structure of Specimen P-1 (100%-V), 256X, shown for comparison purposes and not as part of our invention.
Figure 8:
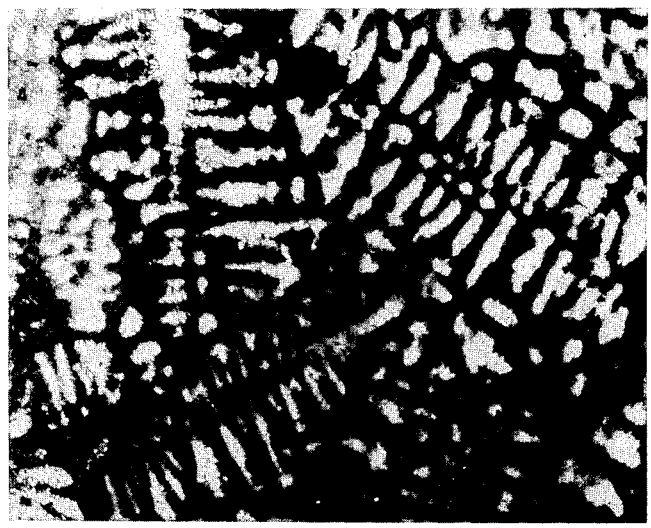
FIG. 8 is a light micrograph of solidification structure of Specimen P-2 (90.5V—9.5Ti), 256X in accordance with our invention.
Figure 9:
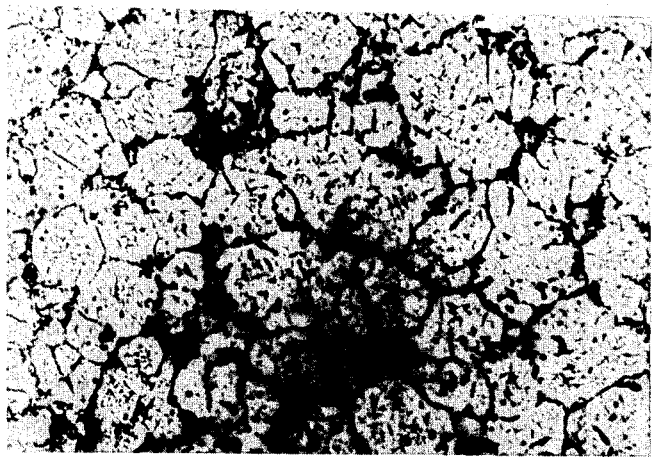
FIG. 9 is a light micrograph of solidification structure of Specimen P-26 (47.7V—52.3Fe), 256X in accordance with our invention.

The microstructural analysis of the twenty-six, as-cast specimens were typical microstructures (normally associated with substantial alloy contents and non-equilibrium solidification). Three distinct structures were observed in the as-cast specimens. These were the columnar, columnar dendritic, and equiaxed structures. The columnar structure was observed only in Specimen P-1 (100%-V) and obviously reflected the inherent lack of alloy content in that specimen. This is shown in FIG. 7. The columnar dendritic structure such as shown in FIG. 8 was the predominant structure observed and was characteristic of the structures of all remaining specimens, with the exception of Specimens P-20, P-21, P-25, and P-26. These four specimens possessed fine, equiaxed structures, such as shown in FIG. 9.

Figure 10:
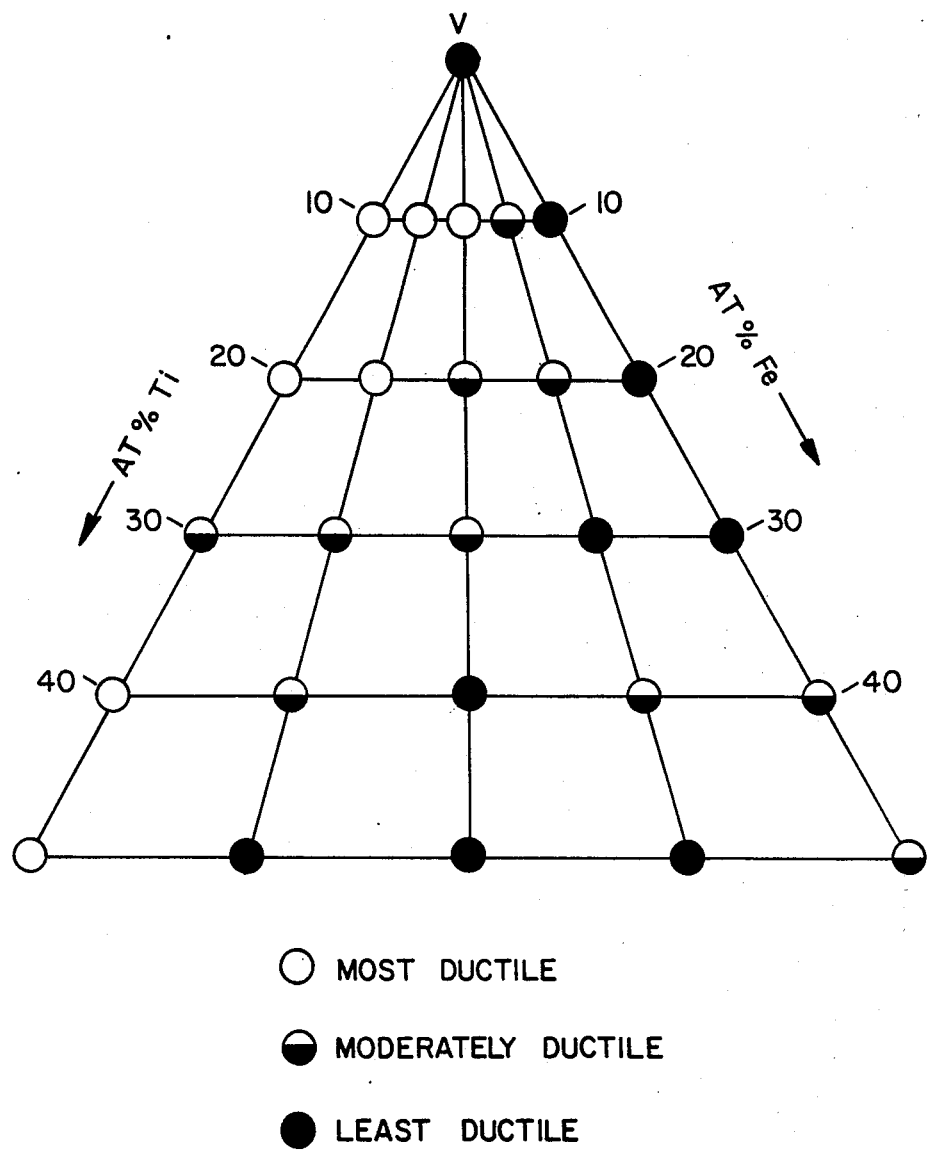
FIG. 10 is a diagram showing brittleness characteristics of weld metals and alloys in accordance with our invention.

The brittleness test results are shown in FIG. 10 and confirmed conclusions drawn from the previously mentioned tests.

The brittleness variation is believed to reflect the ability of titanium to ameliorate the embrittling effects of the interstitial oxygen and nitrogen impurities, except where the V-Ti-Fe intermetallic or gamma phase may assert its influence. In any event, the variation is described qualitatively in FIG. 10, which indicates that many of the V-Ti-Fe alloys were less brittle than the nominally pure vanadium specimen. Further, it seems reasonable to suggest that had ductile vanadium been employed in the fabrication of Specimens P-1 through P-26 many of the resulting specimens would have been more ductile than the nominally pure vanadium selected which had a composition as noted in Table 3. These results were likewise supported by fracture stress or breaking stress analysis which showed significant yield strength for the same group of alloys.

Based on these results, a generally acceptable weld metal or weldment is one having a composition consisting predominantly of a metal having solid solubility in titanium and/or iron. Preferably this metal will be vanadium although it is possible that other such metals such as molybdenum would be satisfactory. It also may be that a combination of such metals would be satisfactory however this would mean having a weld metal or weldment of titanium, iron and two other metals, and the complexities of dealing with a quadtenary system make such a selection seemingly disadvantageous and unnecessary. The generally acceptable weld metal composition will also include Ti and Fe in a total amount of about 50%, with both metals being present.

A more preferred weld metal will be one which is vanadium rich, i.e. upwards of 70% and preferably 80% further it is also preferred that such composition consist of titanium being present in amounts exceeding the Fe content, i.e. a Ti/Fe content ratio being no less than 1. Such a weld metal allows the widest latitude of increased interstitial content in the vanadium and the titanium and welding parameters, particularly wide latitude in rapid quench or cooling rates while assuring a weld metal free of brittle intermetallic compound and thus providing stronger, higher quality welds having a body centered cubic structure. For these reasons it is considered particularly advisable to avoid an iron rich weld.

A satisfactory method of making such an alloy in as cast form and the manner in which all 26 specimen referred to in Table 1 were produced is to begin with the alloy constituents in powder form and to then weigh, blend and press such powders into a briquette, then sintering the briquette and thereafter melting it and quenching it.

Chemistries of the constituent powders used are presented in Table 2 below.

It will be recognized that the interstitial content of the vanadium is very high and unfortunately this is sometimes common with commerically available metal. It is desirable that the vanadium be as pure as possible and to the extent it is, the greater concentration of Ti and Fe will produce better higher strength welds.

TABLE 2

INTERSTITIAL CONCENTRATION DATA FOR CONSTITUENT VANADIUM, TITANIUM AND IRON POWDERS AND FOR SINTERED AND ARC-MELTED CONSTITUENT VANADIUM

| Specimen Designation | Interstitial Concentration (PPM)* | | | |
| --- | --- | --- | --- | --- |
| | Oxygen | Nitrogen | Hydrogen | Carbon |
| Vanadium Powder | 4,280 | 895 | 48 | 360 |
| Titanium Powder | 3,085 | 450 | 427 | 115 |
| Iron Powder | 370 | 24 | 8 | 10 |
| Vanadium, Sintered | 5,880 | 975 | 15 | 450 |
| Vanadium, Arc-Melted | 5,045 | 1,065 | 4 | 510 |

The weighing of the constituent powders was done using a Mettler Model PN323 precision balance. The powders were weighed to the nearest milligram, then loaded into 100 milliliter capacity containers. The total weight of powder corresponding to each bulk composition was 100 grams. During weighing, every effort was made to minimize the possibility of contamination of either the constituent powders or the resulting powder mixtures. Further, exposure of the constituent powders to the atmosphere was minimized by keeping their containers closed, except when the powders were actually being removed.

Blending of the constituent powders was accomplished using a conventional New Brunswick Scientific Company Model TC-6 rotation device fitted to accommodate the 100 milliliter specimen containers. To achieve the maximum blending effect, the containers were secured in a manner precluding rotation, the axis of rotation of the containers was placed at about 5 to 6 degrees above the horizontal, and the speed of rotation of the containers was set at about 28 revolutions per minute. These conditions appeared to yield the best stirring and, hence, the best blending action. The blending procedure was carried out for a period of two hours, for each group of powder mixtures.

The blended powders were then each pressed into cylindrical shape using a 20-ton capacity industrial press equipped with a 0.910 inch diameter die and set to apply a maximum load of 12 tons for a period or dwell time of about 3 seconds.

While the thickness of the pressed cylinders varied with composition, they were generally about one-half inch thick. To avoid contamination of the powders during pressing, the punch, die and immediate surroundings were cleaned thoroughly with compressed air and with acetone, after each powder mixture of a given bulk composition had been pressed. Immediately after pressing, sintering of the pressed powder cylinders was carried out in a Richard D. Brew and Company Model 580C, high-temperature, controlled-atmosphere furnace. The furnace was equipped with a graphite heating element that made it possible to obtain operating temperatures up to 3,000° C. In addition, the furnace incorporated a high-vacuum system that was capable of producing and maintaining a vacuum of about 7 to 8 microns of mercury, and a gas distribution system that allowed the introduction of a variety of gases at any time during thermal processing.

At the start of each sintering run, the furnace was pumped down to 10–15 microns of mercury and held there for about 5 minutes. It was then back-filled with dry nitrogen to a partial vacuum of 20 inches of mercury and held there for about 2 minutes. Next, the furnace was again pumped down to 10–15 microns of mercury and held there for about 5 minutes. This time, however, the furnace was back-filled with helium to about 10 inches of mercury and held there for about 2 minutes. Finally, the furnace was once again pumped down to 10–15 microns of mercury and held there for 5 minutes, before the application of power to the furnace heating elements.

Based on the results of several preliminary runs, the target temperature and time were selected to be 900° C. and 30 minutes respectively. These were the minimum temperatures and time required for the adequate bonding of the pressed powders. Furthermore, 900° C. was the minimum temperature attainable in the furnace, due to controller characteristics, and was the minimum readily measureable with the optical pyrometer. An initial power setting of "80" was employed in all the runs. Then, as the measured temperature approached 900° C., the power setting was reduced to "30", where it was left for the remainder of the run. The rising temperature typically overshot the 900° C. mark by about 25° C. Toward the end of each run, the temperature tended to drop below 900° C. by a similar amount. A vacuum of 10-15 microns of mercury was maintained through the duration of each run.

Following each sintering run, the furnace was allowed to cool, under vacuum, for at least one hour. Then, it was back-filled with helium and allowed to cool for several additional hours. After the furnace had cooled to near room temperature, the sintered cylinders were removed from the furnace and returned to their original polyethylene bottles to await melting, the final step in the alloy fabrication process.

The melting of the sintered cylinders was accomplished in a Vacuum Industries vacuum arc melting furnace. The furnace was powered by four constant current, D-C power supplies that were capable of delivering up to 1,300 amperes of operating current. The furnace incorporated also a high-vacuum system capable of producing and maintaining a vacuum of less than 10 microns of mercury. In addition, the furnace included a system for the controlled introduction of several gases, including argon, helium, and nitrogen. The furnace also had a high-frequency start capability. The actual melting of the cylinders was done in a water-cooled copper block that contained five separate molds. Each of the molds was about one-half inch deep, one and one-fourth inches in diameter, and tapered to facilitate removal of the solidified specimens.

At the start of the melting procedure, the furnace was evacuated to less than 10 microns of mercury, where it was held for about 5 minutes. It was then back-filled with dry nitrogen to 10 inches of mercury and held there for another 5 minutes. Next, the same pump-down and back-fill procedure was repeated with helium. Finally, the furnace was once again pumped down to less than 10 microns of mercury, held there for 5 minutes, and then back-filled to 10 inches of mercury with a 50-50 volume percent mixture of argon and helium. This was the atmosphere in which all of the melting took place.

A pure vanadium "getter" was melted first, then each of the two pairs of sintered cylinders. Stirring of the molten pools was accomplished by manipulations of the electrode and was continued for about 30 seconds for each specimen. It was found that a working distance of about three-fourths inch provided the best combination of arc stability and stirring action. Greater working distances led to arc instability and wander, and smaller working distances caused the molten material to spatter. A taper at least one inch long and a fairly sharp tip on the tungsten electrode were essential to good arc stability and control. All specimens were melted using a 50 percent power setting, which yielded a constant operating current of about 640 amperes.

On the completion of each melting cycle, the furnace was once again pumped down to less than 10 microns of mercury, where it was held for at least 5 minutes. Then, the furnace was back-filled with helium to about 5 inches of mercury and allowed to stand for an additional 10 minutes. At the conclusion of this 10 minute period, the furnace was opened and the specimens were either turned, in preparation for a second melting, or were removed from the furnace and put into their associated polyethylene bottle for storage. Approximately three hours were required to carry out the dual melting of a given set of sintered cylinders.

This weld alloy may also be produced by any fast fusion welding process, including butt welding or resistance welding; the fusion rate being fast enough to avoid the slower forming intermetallic compound phases. For example, we have joined together by capacitor discharge welding Ti-6Al-4V and type 4130 steel rods between which a strip of high purity vanadium was inserted. Sputtering the vanadium on one or both such rods is another option. Each rod was of one-fourth inch diameter and had a standard flat-to-flat joint configuration. The vanadium sheet was ⅜ inch wide and 0.010 inch thick. The welder used was a H. A. Jones, model no. PPW-100. A controlled atmosphere per se was not employed; although, the area around the titanium alloy/vanadium interface was flooded with industrial quality argon gas. A weld schedule showing sample designation, applied voltage, drop height, and drop load is provided in Table 3 below.

TABLE 3

| | WELD SCHEDULE | | |
|---|---|---|---|
| Sample Designation | Applied Voltage (V) | Drop Height (In) | Drop Load (Kg) |
| B-1 | 112 | 2.6 | 1.8 |
| B-2 | 100 | 2.6 | 1.8 |
| B-3 | 80 | 2.6 | 1.8 |
| B-4 | 90 | 2.6 | 1.8 |
| B-5 | 95 | 2.6 | 1.8 |
| B-6 | 95 | 2.6 | 1.8 |

Four as-welded samples were tested on a Tinius testing machine for tensile breaking strength. Samples B-3 and B-4 both broke at a tensile stress of about 14,000 lb/in$^2$. Visual fracture surface examination of both samples indicated that extensive incomplete fusion had been obtained. Samples B-5 and B-6 broke at tensile stresses of 20,000 lb/in$^2$ and 24,000 lb/in$^2$, respectively, thus confirming that under proper conditions a suitable strength weld was obtainable. Further sample B-2 was subjected to x-ray analyses using an x-ray energy dispersion analysis system. Spot probes indicated that that composition across the fusion zone was of the order of 60V-20Fe-20Ti, except in a unique band of a few microns thick of apparently unique material.

Having produced such an alloy one use thereof is to fabricate the alloy as an intermediate sheet to be placed between a titanium sheet and a steel support structure or sheet and resistance weld the composite structure, such as described in U.S. Pat. No. 3,038,988 to Kessler et al the disclosure of which is incorporated herein by reference. Noteworthy is the fact that whereas Kessler et al was particularly concerned that actual complete fusion of the intermediate vanadium sheet was to be avoided, it is contemplated that these alloys will be completely fused but yet the brittle intermetallic compounds normally associated with such a process will be substantially reduced and, hopefully, eliminated all together.

Obviously, numerous modifications and variations of the present invention are possible in the light of the above teachings. It is therefore to be understood that within the scope of the appended claims, the invention may be practiced otherwise than as specifically described herein.

I claim:

1. A weld metal for welding of titanium member to a ferrous based alloy member as an intermediate transition zone between such members so as to overcome the metallurgical incompatibility of each such member, said weld metal consisting of a vanadium metal and titanium and iron.

2. A weld metal according to claim 1 wherein, said vanadium metal is present in an amount by weight of at least 25%.

3. A weld metal according to claim 1 wherein, said titanium and iron metals are present collectively in an amount by weight ranging from about 10% to about 50%.

4. A weld metal according to claim 3 wherein, the iron metal is present in an amount by weight of no more than about 40%.

5. A weld metal according to claim 4 wherein, the iron metal when present with the titanium metal is present in an amount no more than about 30%.

6. A weld metal according to claim 1 wherein, said titanium metal is present in an amount by weight of at least about 2.5% and said iron metal is present in amounts of at least 2.5%.

7. A weld metal according to claim 1, wherein said vanadium metal is present in an amount exceeding 70% and said titanium content is at least equal to that of said iron.

8. A weld metal according to claim 7, wherein said vanadium metal is present in an amount exceeding 85%.

9. In a method of welding a titanium member to an iron member, the improvement comprising the step of:
providing at least during the welding process itself a welding alloy consisting of a vanadium metal and at least one other metal taken from the group consisting of titanium and iron,
whereby said alloy will substantially preclude the formation of brittle intermetallic compounds.

10. A composite structure comprising a titanium alloy member and an iron alloy member joined together by a fusion weldment,
said fusion weldment constituting a transition zone of completely fused metals taken from the group consisting of titanium, iron and a base metal having solid solubility with titanium and iron,
said base metal being present in an amount predominant to either said titanium or iron content.

11. A composite structure according to claim 10, wherein said base metal is present in an amount exceeding 70% and said titanium metal content is at least equal to that of the iron content of said iron alloy.

* * * * *